US011327571B2

(12) United States Patent
Nguyen

(10) Patent No.: US 11,327,571 B2
(45) Date of Patent: May 10, 2022

(54) METHOD AND APPARATUS FOR COMPUTER-ASSISTED DRAWING USING PENS WITH TRACKING MARKS

(71) Applicant: Darrion Vinh Nguyen, Milpitas, CA (US)

(72) Inventor: Darrion Vinh Nguyen, Milpitas, CA (US)

( * ) Notice: Subject to any disclaimer, the term of this patent is extended or adjusted under 35 U.S.C. 154(b) by 0 days.

(21) Appl. No.: 17/019,230

(22) Filed: Sep. 12, 2020

(65) Prior Publication Data
US 2022/0083143 A1     Mar. 17, 2022

(51) Int. Cl.
*G06F 3/01*   (2006.01)
*G06F 3/03*   (2006.01)
*G06T 7/73*   (2017.01)
*G06F 3/0354* (2013.01)

(52) U.S. Cl.
CPC ............ *G06F 3/017* (2013.01); *G06F 3/0304* (2013.01); *G06F 3/03545* (2013.01); *G06T 7/74* (2017.01); *G06T 2207/20* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 10,613,666 B2 | 4/2020 | Bushnell et al. | |
| 2003/0095708 A1* | 5/2003 | Pittel | G06V 40/20 382/187 |
| 2015/0169173 A1* | 6/2015 | Chavez | G06F 3/0308 345/419 |
| 2017/0309057 A1 | 10/2017 | Vaganov | |
| 2018/0004324 A1 | 1/2018 | Park | |
| 2020/0042111 A1* | 2/2020 | Connellan | G06F 3/04883 |
| 2020/0218372 A1 | 7/2020 | Yilmaz et al. | |
| 2020/0333891 A1* | 10/2020 | Poore | G06F 3/03542 |
| 2021/0026464 A1* | 1/2021 | Yamada | G06F 3/03545 |

* cited by examiner

*Primary Examiner* — Amare Mengistu
*Assistant Examiner* — Sarvesh J Nadkarni

(57) ABSTRACT

The present disclosure generally relates to a new computer input and tracking device, and method of using, more particularly, a new type of digital pen which tracks user hand movements to generate series of point coordinates that represent a drawing or hand writing. Unlike prior digital pens such as the Apple Pencil™ or the Microsoft Surface Pen™, the new system does not require users to write on a touch-sensitive surface. Users can write on any surface such as a notebook, a table, a board, or even in mid air. Users can draw two-dimensional or three-dimensional drawings. The new method utilizes a pen marked with one or more groups of distinct tracking marks or tracking patterns and a camera to track the pen in real-time. A computer running a 3D algorithm processes the camera images, detects and distinguishes the tracking marks, and uses the tracking marks to calculate the positions of the tip of the pen in three-dimensional space. The positions of the tips of the pen are then sent to a drawing application to generate a drawing or hand writing.

12 Claims, 4 Drawing Sheets

3D PEN POSITION CALCULATIONS

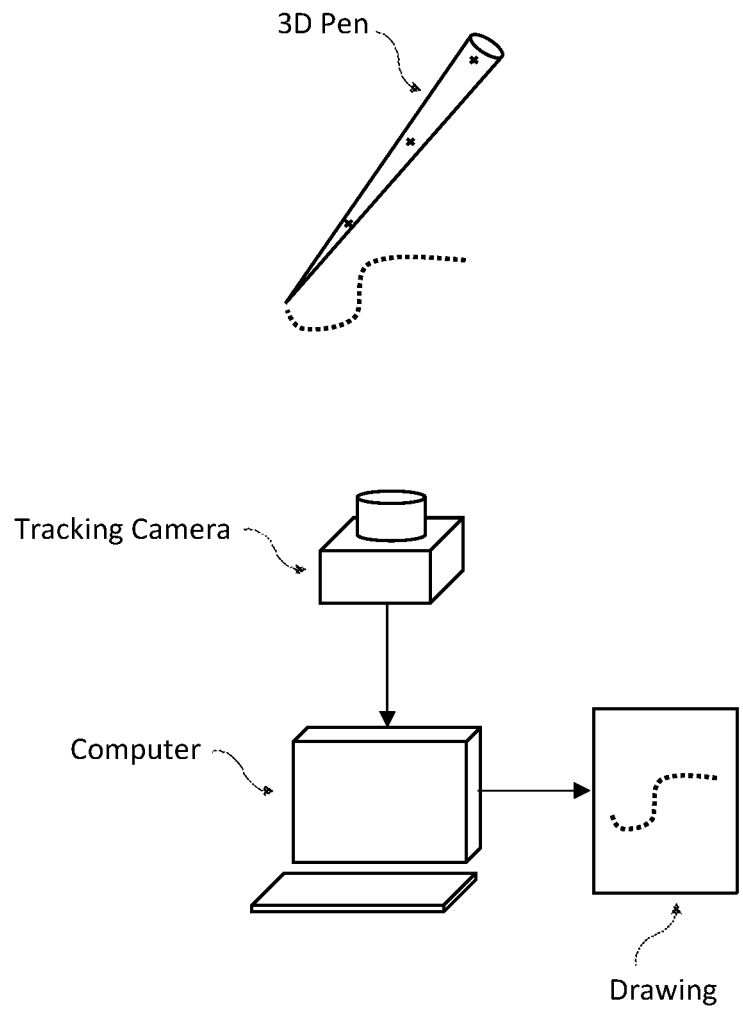
FIGURE 1: A THREE-DIMENSIONAL INPUT SYSTEM

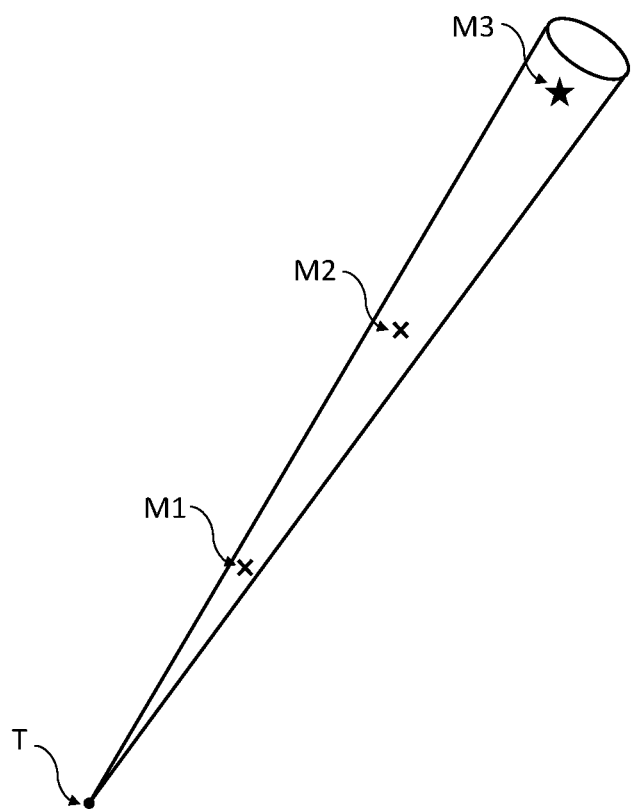
FIGURE 2: A 3D PEN WITH TRACKING MARKS

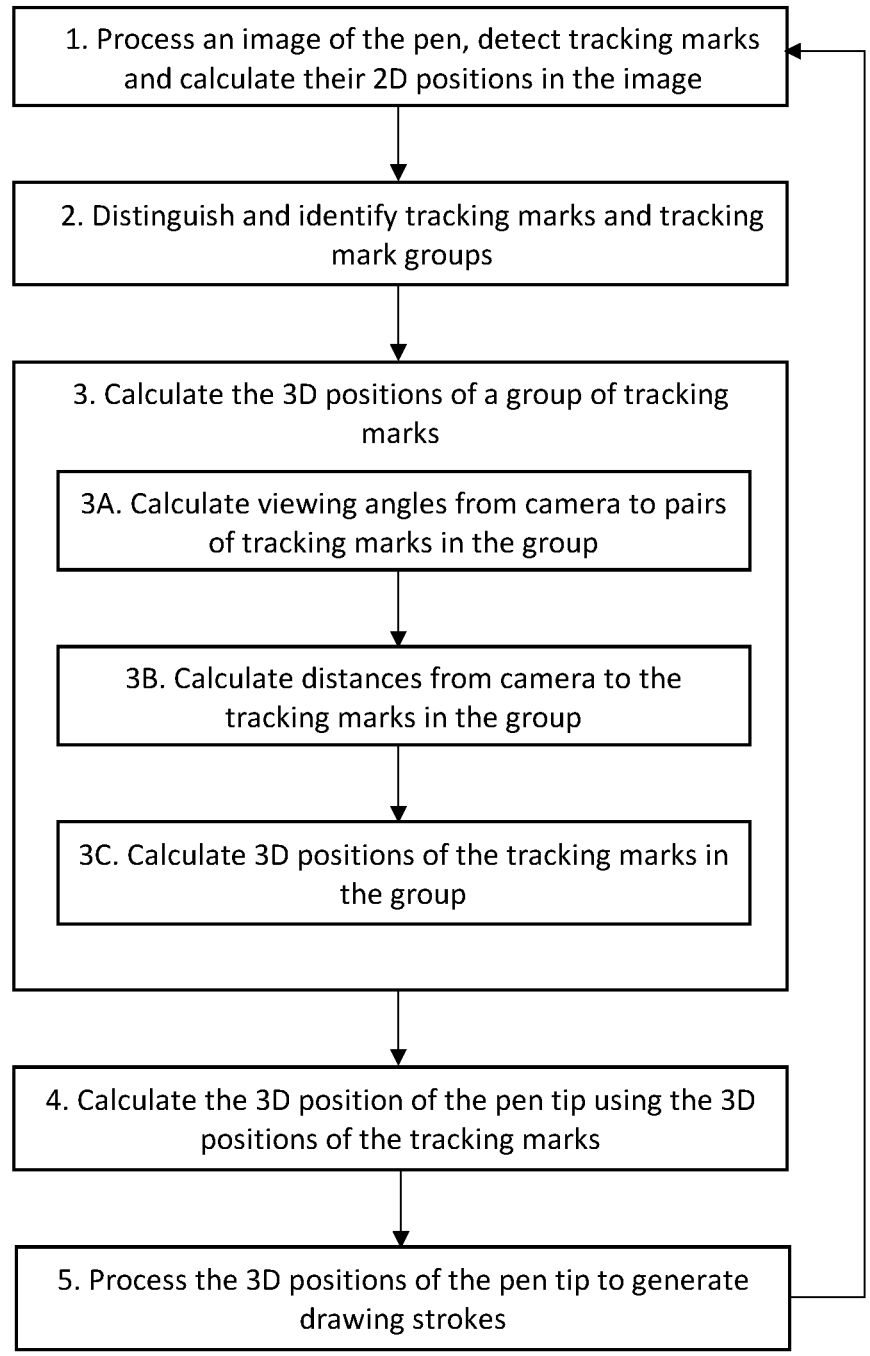
FIGURE 3: 3D PEN ALGORITHM

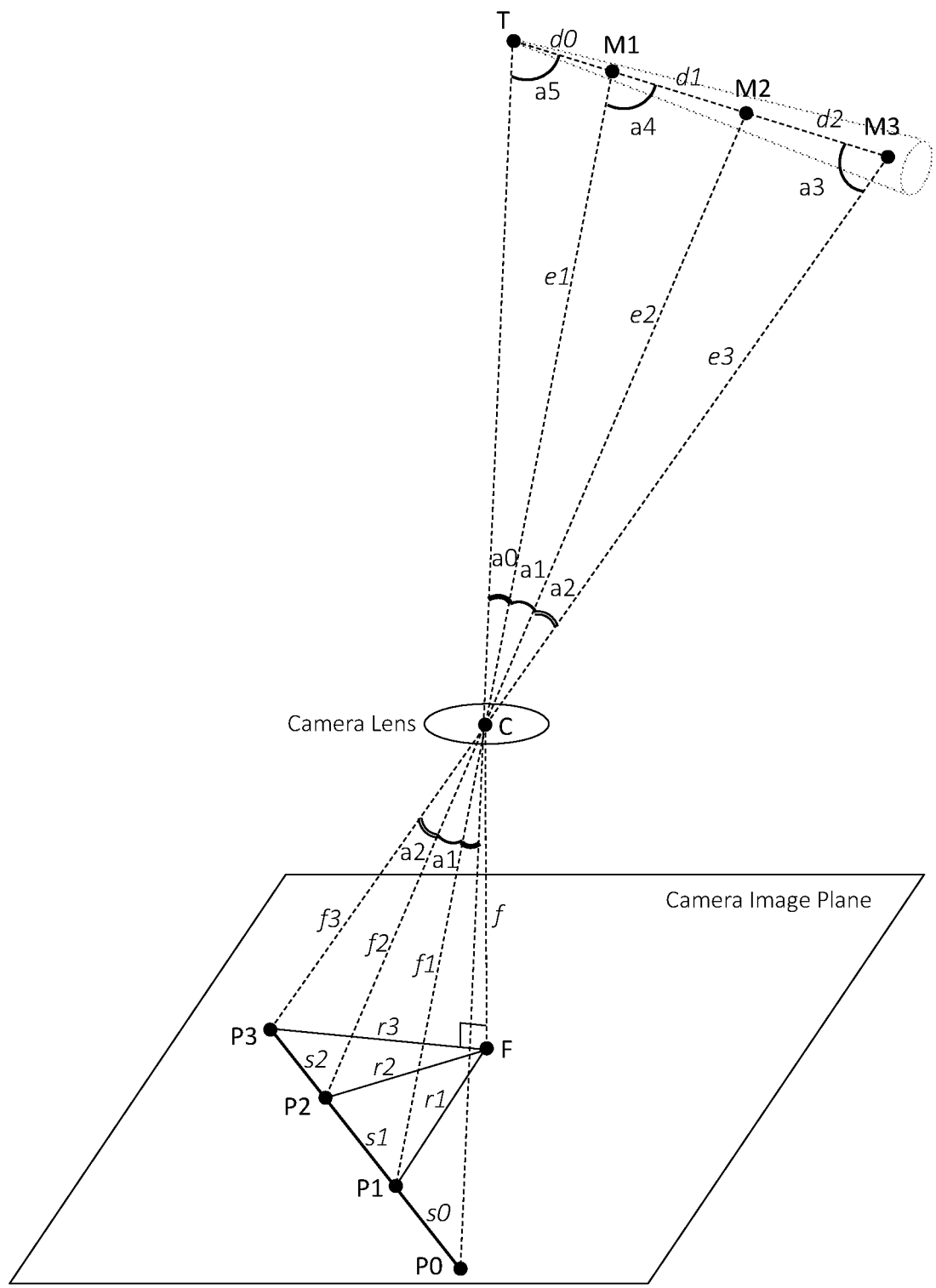
FIGURE 4: 3D PEN POSITION CALCULATIONS

METHOD AND APPARATUS FOR COMPUTER-ASSISTED DRAWING USING PENS WITH TRACKING MARKS

TECHNICAL FIELD

The present disclosure generally relates to the field of computer input and tracking devices and, more particularly, computer-assisted drawing devices such as a pen or a stylus which tracks user hand movements to create series of point coordinates that represent a drawing or hand writing.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Computer-assisted design and drawing applications often require an input device to track user hand movements and translate them to series of computer coordinates representing a drawing or hand writing. Examples of such input devices include digital pens and styluses such as the Apple Pencil™. A digital pen often requires a touch sensitive surface such as an Apple iPad™ to track the positions of the tip of the pen. The use of a touch sensitive surface limits the drawings to the area of the surface, and thus makes such digital pens unsuitable for large drawings when a large touch sensitive surface is expensive or not available.

This disclosure describes a new type of digital pen which allows users to draw on any surface, or even in the air without a hard surface. Users can use the new digital pens to draw not only two-dimensional drawings but also drawings in three-dimensional spaces.

BRIEF DESCRIPTION OF THE DRAWINGS

To provide a more complete understanding of the present disclosure and advantages thereof, reference is made to the attached drawings, like reference numbers represent like parts, in which:

FIG. 1 illustrates an example embodiment of a new 3D input system consisting of a 3D pen, a tracking camera, and a computer that processes camera images to calculate the positions and movements of the 3D pen and generate drawing strokes.

FIG. 2 illustrates an example embodiment of a 3D pen with tracking marks.

FIG. 3 illustrates an example embodiment of the 3D algorithm.

FIG. 4 illustrates an example embodiment of a method to calculate the three-dimensional position of a 3D pen from a two-dimensional image of the tracking marks of the pen.

DESCRIPTION OF EXAMPLE EMBODIMENTS

Overview

A three-dimensional input device that allows computer users to draw on any surface or in three-dimensional space without the need of a touch sensitive drawing pad. The system consists of a pen, a digital video camera, and a computer that runs an algorithm to calculate the three-dimensional positions and orientations of the pen in real-time from the images of the pen.

The pen in this system is marked with three or more distinct tracking marks whose distances between each other are known. The digital video camera captures the images of the pen and sends the images to the computer in real-time. The computer runs a software algorithm that processes the images of the pen from the camera, detects the tracking marks, calculates the three-dimensional positions of the tracking marks, and determines the three-dimensional positions of the pen, in particular the positions of the drawing tip of the pen.

The three-dimensional positions of the tip of the pen are then sent to software applications such as a drawing app or a computer-aid design (CAD) app to create user drawings.

DETAILED DESCRIPTION

FIG. 1 illustrates an example embodiment of the new three-dimensional computer input system which has the following components:

1. A 3D Pen: a handheld device which has three or more distinct tracking marks. A tracking mark can be a small shape or symbol such as a dot, a cross, an asterisk, or a star. A tracking mark can also be a feature point in a geometric tracking pattern such as an intersection in a grid pattern or a corner in a checker board pattern. The position of a feature point in a tracking pattern is calculated using a large number of data points from the image of the tracking pattern to improve tracking accuracy and reduce errors caused by image noises. For example, in a grid pattern, a tracking mark can be the intersection of two straight lines, and a large number of image pixels can be used to calculate the positions and orientations of the lines and the position of their intersection in the image. The tracking marks and patterns can be painted on the surface of the pen or illuminated using small lights such as LED lights. There can be multiple groups of three or more tracking marks so that at least one group is visible when the pen is held at different positions and angles. The distances from each tracking mark to the other tracking marks in the group are known. The distances from some tracking marks to the drawing tip of the pen are also know. The groups of tracking marks and the tracking marks in a group can be distinguished by their relative positions, shapes, colors, or geometric properties. FIG. 2 illustrates one embodiment of the 3D pen with a group of three tracking marks M1, M2, and M3 that form a straight line to the tip T of the pen. The distances from M1 to M2, from M2 to M3, and from M1 to T are known. M3 can be distinguished from M1 and M2 by its distinct star shape. M1 and M2 can be distinguished by their distances to M3 or T. The collinear property of M1, M2, and M3 can be used to distinguish them from other groups. Other embodiments of the 3D pen can have groups with redundant tracking marks to improve accuracy and to ensure that if some marks are hidden or covered by the holding hand, at least three tracking marks are visible by the tracking camera.

2. A Tracking Camera: a digital high-definition video camera that continuously captures the images of the 3D pen. The focal length of the camera lens is known or assumed. The field of view of the camera is wide enough to capture at least three tracking marks on the 3D pen. The images of the 3D pen are streamed in real-time to the tracking computer.

3. A Tracking Computer: a computing device with an input port that receives images of the 3D pen from the tracking camera. The tracking computer runs the 3D Pen Algorithm which processes the images from the camera, detects the tracking marks from the images, and uses the positions of the detected tracking marks in the two-dimensional images to compute the position of the drawing tip of the 3D pen in three-dimensional space. The computer then sends the positions of the drawing tip of the 3D pen in real-time to the application that requires drawing or hand writing user inputs.

4. 3D Pen Algorithm: a method to process the images of the 3D pen, compute the three-dimensional positions of the drawing tip of the pen, and generate drawing strokes. FIG. 3 illustrates an example embodiment of the 3D Pen Algorithm.

In the first step, an image of the 3D pen is processed using techniques such as image sharpening, smoothing, and noise reduction, and the tracking patterns and tracking marks are detected and extracted from the image using techniques such as dot detection, corner point detection, feature detection, edge detection, line detection, image segmentation, adaptive threshold, pattern recognition, machine learning, color filters, and other digital filters. The position of a tracking mark in the two-dimensional image is calculated using methods such as finding the center of gravity of a shape or calculating the intersection of two lines.

In the second step, the tracking marks and tracking mark groups are distinguished and identified using their colors, shapes, relative positions, geometric properties or patterns. For example, the tracking marks which are collinear can be distinguished and put in a group. In other embodiments, the tracking marks can be grouped by their colors or positions.

In the third step, the three-dimensional positions of a group of three or more tracking marks are calculated using the positions of the tracking marks in the two-dimensional images, the distances from the tracking marks to each other, and the focal length of the camera.

FIG. 4 illustrates an example embodiment of the calculations of the positions of the tracking marks and the tip of the pen. C is the position of the camera lens (convergence point). F is the central focal point of the camera on the image plane. Reference point T is the tip of the pen. M1, M2, and M3 are the three-dimensional positions of the tracking marks, and d0, d1 and d2 are the distances from T to M1, M1 to M2, and M2 to M3 respectively. P1, P2, and P3 are the projections of the tracking marks M1, M2, and M3 respectively on the two-dimensional camera image. The positions of P1, P2, and P3 are determined in the first step above. Angle a1 is the viewing angle between the tracking marks M1 and M2 as viewed from the camera. Angle a2 is the viewing angle between the tracking marks M2 and M3 as viewed from the camera. The positions of the tracking marks can be calculated using the following sub-steps:

3A. Calculate the viewing angles a1 and a2: First, calculate the distances s1 and s2 between P1 and P2 and between P2 and P3 respectively. Calculate the distances r1, r2, and r3 between the central focal point F to P1, P2, and P3 respectively. Calculate the distance f1 from C to P1 using the two sides f and r1 of the right triangle [C, F, P1]. Similarly, calculate the distances f2 and f3 from C to P2 and P3 respectively. Calculate the viewing angle a1 using the three sides f1, f2, and s1 of the triangle [C, P1, P2]. Similarly, calculate the viewing angle a2 using f2, f3, and s2.

3B. Calculate the distances e1, e2, and e3 from C to the tracking marks M1, M2 and M3 respectively: From the facts that the area of the triangle [C, M1, M2] is e1·e2·sin(a1)/2, the area of triangle [C, M2, M3] is e2·e3·sin(a2)/2, and the ratio of the two areas is d1/d2, calculate the angle a3 in the triangle [M1, M3, C] using the formula:

$$\tan(a3)=(d1/d2)\sin(a1+a2)/[\sin(a1)/\sin(s2)-\cos(a1+a2)]$$

Calculate the angle a4 in the triangle [M1, M3, C] using the formula:

$$a4=180°-(a1+a2+a3)$$

Calculate e1, e2, and e3 using the angles a1, a2, a3, a4, and the distances d1, d2 according to the Law of Sines:

$$e1=(d1+d2)\sin(a3)/\sin(a1+a2)$$

$$e2=d1\sin(a4)/\sin(a1)$$

$$e3=(d1+d2)\sin(a4)/\sin(a1+a2)$$

3C. Calculate the three-dimensional positions of the tracking marks: Let M1, M2, and M3 be the positions of the tracking marks and P1, P2, and P2 be the positions of their projections on the camera image plane in a three-dimensional Cartesian coordinate system whose origin is at the convergence point C of the camera lens. Calculate M1, M2, and M3 using:

$$M1=-(e1/f1)P1$$

$$M2=-(e2/f2)P2$$

$$M2=-(e3/f3)P3$$

In a different embodiment, M1, M2, and M3 are not collinear. The four points C, M1, M2, and M3 form a tetrahedron. The three-dimensional positions of M1, M2, and M3 can be calculated using the three distances between M1 and M2, between M2 and M3, and between M3 and M1, and the three viewing angles from C to M1 and M2, from C to M2 and M3, and from C to M3 and M1, which are equal to the angles from C to P1 and P2, to P2 and P3, and P3 and P1 respectively.

In the fourth step, the three-dimensional position of the reference point T, which refers to the tip of the pen, is calculated using the distances from T to the tracking marks and the three-dimensional positions of the tracking marks. For example, if T, M1 and M2 are collinear, the position of T can be calculated using linear extrapolation:

$$T=((d0+d1)M1-d0\cdot M2)/d1$$

In the fifth step, the three-dimensional positions of the drawing tip T of the pen are processed in real-time to generate the drawing strokes. In one embodiment, there is a button or pressure sensor in the 3D pen for user to indicate the start and end of each drawing stroke. In another embodiment, the start and end of a stroke can be automatically detected by analyzing the positions and movements of the drawing tip of the 3D pen relative to the drawing surface. If the position of the tip of the pen moves away from the drawing surface, the drawing stroke ends, if the position of the tip of the pen moves back on to the drawing surface, a new stroke starts. If the drawing surface is a flat plane, the drawing surface can be detected by analyzing three or more previous positions of the tips of the 3D pen on the surface.

In another embodiment, a generic object can be tracked instead of a drawing pen. The generic object can have three or more tracking marks and multiple reference points such as tips, end points, corners, holes, the center of gravity, and other distinct points of the object. The three-dimensional positions of the reference points can be calculated using the distances from the reference points to the tracking marks and the three-dimensional positions of the tracking marks. The three-dimensional positions of the reference points then can be used to determine the dimensions, positions, orientations, and movements of the object in three-dimensional space.

In some embodiments, the distances from some reference points to the tracking marks are not known in advance. In these cases, the distances can be calculated using one or more calibration images. If a reference point and the tracking marks are collinear or coplanar, only a single calibration image is needed. For example, in FIG. 4, if the distance d0 from the reference point T (the drawing tip of the pen) to the tracking mark M1 is not known in advanced, and P0 is the position of T in the two-dimensional camera image, then P0 and P1 can be used to calculate the viewing angle a0 from C to P0 and P1 (and to T and M1), similar to step 3A above. Since T, M1, and M2 are collinear, angle a5=a4−a0, and d0 can be calculated using the Law of Sines for triangle [C, T, M1]:

$$d0 = e1\, \sin(a0)/\sin(a5)$$

If a reference point and the tracking marks are not coplanar, two calibration images of the object are taken from different perspectives by moving the object. The positions of the tracking marks in the two images are used to calculate the object displacement. Given the displacement, stereoscopic triangulation is then used to calculate the three-dimensional position of the reference point and subsequently its distances to the tracking marks.

Similar calibrations can be used to determine the three-dimensional positions of other tracking marks. Thus starting from a group of three tracking marks with known distances to each other, the distances between all tracking marks to each other can be calculated.

What is claimed is:

1. A method of object tracking and computer input comprising:
   utilizing an object with tracking marks, wherein the tracking marks include a group of at least three distinct tracking marks whose distances between each other are known;
   utilizing a camera to capture images of the tracking marks of the object;
   utilizing a computer that receives the images of the tracking marks of the object; and
   running a computer algorithm comprising:
      processing an image of the object and detecting the group of at least three tracking marks and their two-dimensional positions in the image;
      using the two-dimensional positions of the group of at least three tracking marks to calculate at least two viewing angles from the camera to two pairs of tracking marks in the group of at least three tracking marks;
      using at least the two viewing angles from the camera to the two pairs of tracking marks and the known distances between the tracking marks in the group of at least three tracking marks to calculate distances from the camera to the group of at least three tracking marks; and
      using the distances from the camera to the group of at least three tracking marks and their two-dimensional positions in the image to calculate three-dimensional positions of the group of at least three tracking marks.

2. The method of claim 1, wherein the tracking marks in the group of at least three tracking marks are colinear to simplify the calculations of the computer algorithm.

3. The method of claim 1, wherein the computer algorithm includes a calibration step to use at least two images of a reference point with unknown position on the object and the group of at least three tracking marks whose distances between each other are known to calculate the position on the object of the reference point and its distances to the group of tracking marks.

4. The method of claim 1, wherein the computer algorithm includes a calibration step to use at least two images of a group of tracking marks whose distances between each other are not known and the group of at least three tracking marks whose distances between each other are known to calculate distances between tracking marks in the group of tracking marks whose distances between each other are not known.

5. The method of claim 1, wherein the object is a pen, and the computer algorithm includes a step to detect the drawing plane using three or more three-dimensional positions of the drawing tip of the pen.

6. The method of claim 5, wherein the computer algorithm includes a step to detect a beginning and an end of a drawing stroke by detecting movements of the drawing tip of the pen onto or away from the drawing plane.

7. An apparatus of object tracking and computer input comprising:
   an object with tracking marks, wherein the tracking marks include a group of at least three distinct tracking marks whose distances between each other are known;
   a camera that captures images of the tracking marks of the object;
   a computer that receives the images of the tracking marks of the object; and
   a computer algorithm comprising:
      processing an image of the object and detecting the group of at least three tracking marks and their two-dimensional positions in the image;
      using the two-dimensional positions of the group of at least three tracking marks to calculate at least two viewing angles from the camera to two pairs of tracking marks in the group of at least three tracking marks;
      using at least the two viewing angles from the camera to the two pairs of tracking marks and the known distances between the tracking marks in the group of at least three tracking marks to calculate distances from the camera to the group of at least three tracking marks; and
      using the distances from the camera to the group of at least three tracking marks and their two-dimensional positions in the image to calculate three-dimensional positions of the group of at least three tracking marks.

8. The apparatus of claim 7, wherein the tracking marks in the group of at least three tracking marks are colinear to simplify the calculations of the computer algorithm.

9. The apparatus of claim 7, wherein the computer algorithm includes a calibration step to use at least two images of a reference point with unknown position on the object and the group of at least three tracking marks whose distances between each other are known to calculate the position on the object of the reference point and its distances to the group of tracking marks.

10. The apparatus of claim 7, wherein the computer algorithm includes a calibration step to use at least two images of a group of tracking marks whose distances between each other are not known and the group of at least three tracking marks whose distances between each other are known to calculate distances between tracking marks in the group of tracking marks whose distances between each other are not known.

11. The apparatus of claim 7, wherein the object is a pen, and the computer algorithm includes a step to detect the drawing plane using three or more three-dimensional positions of the drawing tip of the pen.

12. The apparatus of claim 11, wherein the computer algorithm includes a step to detect a beginning and an end of a drawing stroke by detecting movements of the drawing tip of the pen onto or away from the drawing plane.

* * * * *